US010596682B2

(12) United States Patent
Woods

(10) Patent No.: US 10,596,682 B2
(45) Date of Patent: Mar. 24, 2020

(54) CLAMP ASSEMBLY

(71) Applicant: Sherwood Manufacturing Corporation, Northport, MI (US)

(72) Inventor: Raymond Woods, Traverse City, MI (US)

(73) Assignee: Sherwood Manufacturing Corporation, Northport, MI (US)

( * ) Notice: Subject to any disclaimer, the term of this patent is extended or adjusted under 35 U.S.C. 154(b) by 162 days.

(21) Appl. No.: 15/916,888

(22) Filed: Mar. 9, 2018

(65) Prior Publication Data

US 2019/0275645 A1 Sep. 12, 2019

(51) Int. Cl.

| | |
|---|---|
| ***B23Q 3/08*** | (2006.01) |
| ***B25B 5/16*** | (2006.01) |
| ***B25B 5/12*** | (2006.01) |
| ***B25B 5/04*** | (2006.01) |

(52) U.S. Cl.
CPC ................ *B25B 5/163* (2013.01); *B25B 5/04* (2013.01); *B25B 5/12* (2013.01)

(58) Field of Classification Search
CPC .... B25B 1/00; B25B 1/14; B25B 1/08; B25B 1/2457; B25B 5/00; B25B 5/12
See application file for complete search history.

(56) References Cited

U.S. PATENT DOCUMENTS 6,817,603 B2 * 11/2004 Kofod ..................... B25B 5/163 269/228
7,648,131 B2 * 1/2010 Hagan ..................... B25B 5/12 269/201
8,123,205 B2 * 2/2012 Martin ..................... B25B 5/16 269/201
8,505,864 B1 * 8/2013 Taylor ..................... F24S 25/636 248/237
8,613,433 B2 * 12/2013 Poole ..................... B25B 5/04 269/228
8,827,255 B2 * 9/2014 Woods ..................... B25B 5/163 269/120
2008/0185761 A1 * 8/2008 Jurcinsky ..................... B25B 5/12 269/263
2019/0275645 A1 * 9/2019 Woods ..................... B25B 5/04

* cited by examiner

*Primary Examiner* — Lee D Wilson
(74) *Attorney, Agent, or Firm* — Dinsmore & Shohl LLP; Cesare Sclafani

(57) ABSTRACT

A clamp adapter for use with a lever operated quick connect clamp having spaced apart clamping arms. The clamp adapter includes a one piece body having an upper section which is slidably positioned between the clamping arms and a base which abuts against the bottom the clamping arms. Threaded fasteners secure the body to the clamping arms. An elongated rod is slidably positioned in a through bore in the body and locked in place by a bolt.

7 Claims, 1 Drawing Sheet

CLAMP ASSEMBLY

BACKGROUND OF THE INVENTION

I. Field of the Invention

The present invention relates generally to clamps and, more particularly, to a lever operated quick connect clamp.

II. Description of Related Art

There are many previously known lever operated clamps that are used for temporarily clamping items to a structure. For example, such clamps are oftentimes used to assemble work in order to properly secure and position pieces for assembly during the assembly process. Many of these clamps are sold under the trademarks DESTACO, CARR LANE, etc.

These previously known lever operated clamps typically include a base which is secured to a substructure of some sort. One end of an elongated clamping arm is pivotally mounted to the base so that the clamping arm is movable between a hold and a release position along a generally circular arc. An elongated lever is pivotally mounted to both the base and the clamping arm and is operable to actuate the clamping arm between its hold and its release position.

Conventionally an elongated bolt having an elastomeric bumper at one end is adjustably secured to or near the free end of the clamp arm so that the bolt with the attached bumper moves in unison with the clamp arm. The elastomeric bumper is positioned to engage the workpiece desired to be clamped and protects the workpiece from the clamping force.

Many of these previously known clamp assemblies require two or more tools to adjust the position of the bumper. However, in at least one prior clamp assembly described in U.S. Pat. No. 8,827,255, a single knob was used to attach and adjust the position of the rubber bumper. While this previously known clamp assembly proved highly advantageous over previously known clamp assemblies, it still suffered from some limitations.

SUMMARY OF THE PRESENT INVENTION

The present invention provides a clamp adapter which overcomes the above-mentioned disadvantages of the previously known devices.

In brief, the present invention provides a clamp adapter for use with a quick release clamp of the type having a pair of spaced apart lever arms. These lever arms pivot between a release and a clamping position upon movement of a locking arm for the clamp assembly.

The present invention provides a clamp adapter having an upper portion which is positioned in between the lever arms. A lower base of the clamp adapter extends laterally outwardly from the upper section and abuts against the bottom of the clamping arms. In order to secure the clamp adapter to the lever arms, a pair of fasteners, such as button head cap screws, threadably engage threader holes formed in the top of the upper section and which, upon tightening, clamp the clamp adapter between the threaded fasteners and the clamp adapter base. Consequently, once the clamp adapter is secured to the clamp arms, the clamp adapter moves in unison with the clamp arms.

A throughbore is provided through the base so that the throughbore extends generally in the same direction as the axis of the clamping arms. An elongated rod having one end adapted to engage the work then has its other end slidably mounted within the throughbore. Once positioned as desired, a threaded fastener, such as a thumbscrew, secures the rod to the base.

BRIEF DESCRIPTION OF THE DRAWING

A better understanding of the present invention will be had upon reference to the accompanying drawing when read in conjunction with the accompanying specification, and in which.

DETAILED DESCRIPTION OF THE INVENTION

Figure 1:
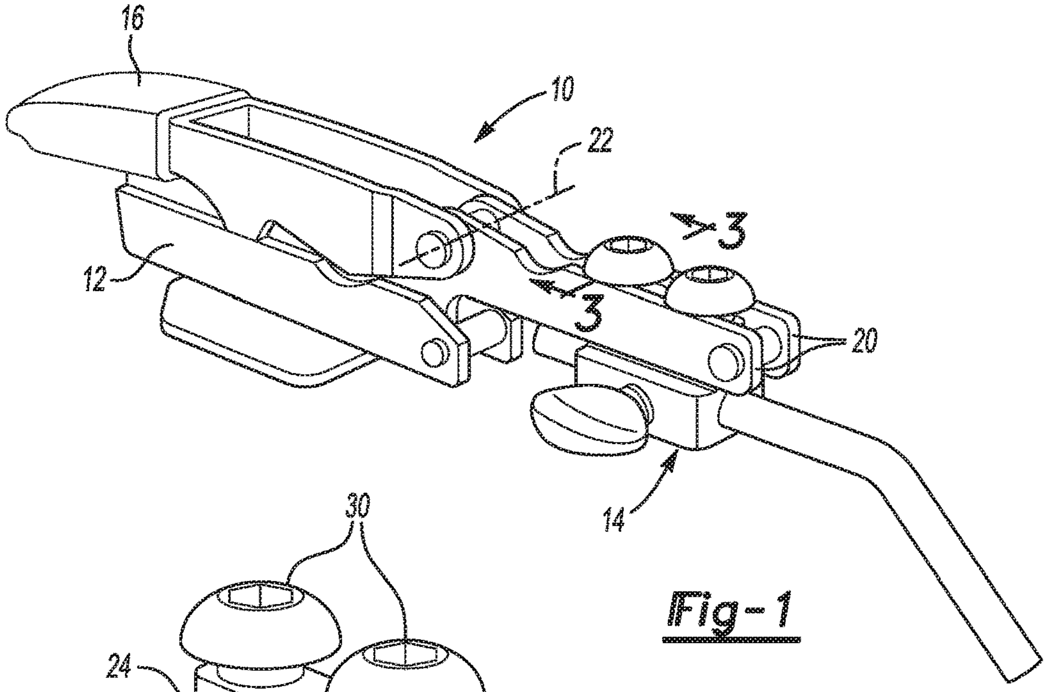
FIG. 1 is an elevational view illustrating a preferred embodiment of the present invention mounted to a quick connect clamp.

With reference now to the patent drawing, a clamp assembly 10 is shown in FIG. 1 with the clamp actuator 12 and a clamp adapter 14 according to the present invention. The clamping assembly 12 is standard in construction and includes a clamping arm 16 which, upon pivoting, pivotally moves a pair of spaced apart clamping arms 20 about a pivot axis 22.

It will be understood, of course, that the clamp assembly 12 shown in FIG. 1 is by way of illustration only. However, in all cases, the clamping arm will include a pair of clamping arms 20 which are spaced apart from each other and will move between a locked and an unlocked position.

Figure 2:
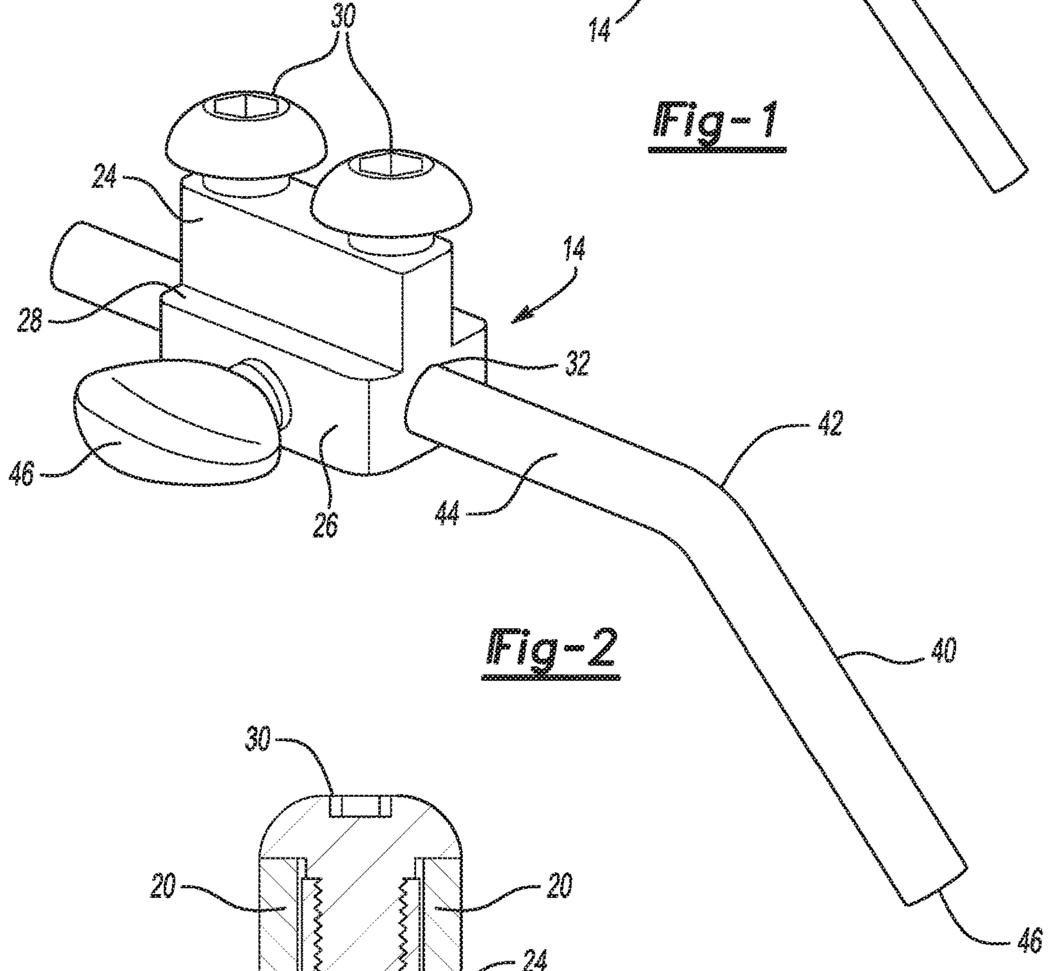
FIG. 2 is a view similar to FIG. 1, but with the quick connect clamp removed.
Figure 3:
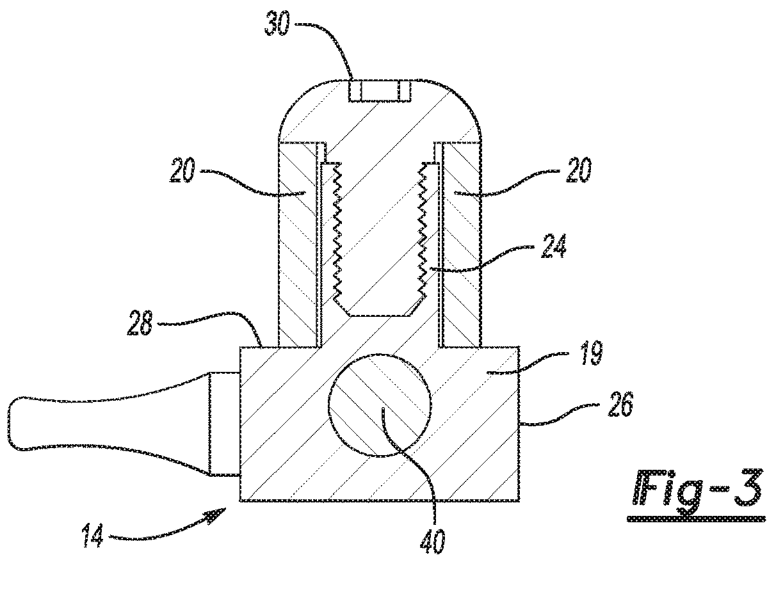
FIG. 3 is a sectional view taken along line 3-3in FIG. 1 and enlarged for clarity.

With reference now to both FIGS. 2 and 3, the clamp adapter 14 includes an upper section 24 dimensioned to be slidably received between the clamping arms 20 of the clamp assembly 10. The clamp adapter 14 also includes a lower base 26 which is preferably of a one piece construction with the upper section 24 and is wider than the upper section 24. As such, the base 26 includes two abutment surfaces 28 which abut against the bottom of the lever arms 20. Furthermore, the height of the upper section 24 is less than the right of the clamping arms 20.

With the clamp adapter 10 positioned in between the lever arms 20 and with the abutment surfaces 28 in abutment with the bottom 21 of the lever arms 20, at least one, and preferably two threaded fasteners 30, such as button head cap bolt, threadably engage the threaded holes in the upper section 24 of the clamp adapter 14. These fasteners 30, furthermore, have a diameter greater than the width of the upper section 20 so that, upon tightening of the fasteners 30, the fasteners 30 abut against the top of the lever arms 20 and securely fasten the clamp adapter 14 to the lever arms 20. It will be appreciated, however, that the longitudinal position of the clamp adapter 14 is slidably adjustable relative to the lever arms 20.

A throughbore 32 is formed longitudinally through the base 28 so that the axis of the throughbore 32 is generally parallel to the axis of the lever arms 20 and thus perpendicular to the pivotal axis of the lever arms 20. An elongated rod 40, which may have a central bend 42, has one end 44 slidably positioned within the throughbore 32 in the base 28. A free end 46 of the rod 42 is then shaped to engage the part to be clamped.

In order to fix the position of the rod 42 relative to the clamp adapter 14, a thumbscrew 46, or other threaded fastener, is threadably mounted to the base 26. Thus, with the clamping rod 42 positioned as desired, upon tightening of the thumbscrew 46, the rod 40 is then secured to the clamp adapter 14 in its adjusted position.

I claim:

1. A clamp adapter for use with a lever operated quick connect clamp having two spaced apart clamping arms comprising a body having an upper section dimensioned to be slidably received between the clamping arms and a base having a width greater than the spacing between the clamping arms, a first fastener threadably attached to said body and dimensioned to abut against the clamping arms so that said upper section of said body is entrapped between said fastener and said base, a rod slidably positioned in a bore in said body, and a second fastener threadably mounted in a hole in said body, said hole intersecting and open to said bore.

2. The invention as defined in claim 1 wherein said body and said base are of a one piece construction.

3. The invention as defined in claim 2 wherein said body is made of plastic.

4. The invention as defined in claim 1 wherein said bore in said body is a through bore.

5. The invention as defined in claim 1 wherein said upper section of said body has a height less than a height of the clamping arms.

6. The invention as defined in claim 1 wherein said first fastener comprises a pair of first fasteners.

7. The invention as defined in claim 1 wherein said first fastener comprises a button head cap bolt.

* * * * *